United States Patent [19]

Inose

[11] 4,363,040

[45] Dec. 7, 1982

[54] SIGNAL TRANSDUCER

[75] Inventor: Shuichi Inose, Inagi, Japan

[73] Assignee: Canon Kabushiki Kaisha, Tokyo, Japan

[21] Appl. No.: 160,162

[22] Filed: Jun. 17, 1980

[30] Foreign Application Priority Data

Jun. 21, 1979 [JP] Japan .................................. 54-78441

[51] Int. Cl.³ .............................................. G11B 5/09
[52] U.S. Cl. .......................................... 360/51; 360/46
[58] Field of Search ........................ 360/40, 43, 51, 46

[56] References Cited

U.S. PATENT DOCUMENTS

| | | | |
|---|---|---|---|
| 3,412,385 | 11/1968 | Wang et al. | 360/51 |
| 3,581,297 | 5/1971 | Behr et al. | 360/40 |
| 4,183,066 | 1/1980 | Anderson | 360/51 |
| 4,222,080 | 9/1980 | Frazier | 360/51 |
| 4,231,071 | 10/1980 | Anderson | 360/51 |
| 4,245,263 | 1/1981 | Rathbun et al. | 360/43 |

*Primary Examiner*—Vincent P. Canney
*Attorney, Agent, or Firm*—Fitzpatrick, Cella, Harper & Scinto

[57] ABSTRACT

There is disclosed a signal transducer for extracting only the data components from information which has been modulated by different modulation systems. More concretely, the transducer provides two kinds of clock signals with respect to the information obtained by modulating the data under the frequency-modulation system or the modified frequency-modulation system, and extracts the data components from the information in accordance with one of the two kinds of clock signals.

7 Claims, 4 Drawing Figures

SIGNAL TRANSDUCER

BACKGROUND OF THE INVENTION

1. Field of the Invention

This invention relates to a device for extracting only the data components from various kinds of information modulated by different modulating systems.

2. Description of Prior Art

There are various kinds of magnetic memory (or recording) devices such as, for example, magnetic tape, magnetic disc, magnetic drum, etc., which are used for electronic computers. These magnetic memory devices are better than punched tape in view of their reliability and high processing speed. As one example, when a magnetic head 2 is contacted with a magnetic disc (recording medium) 1 as shown in FIG. 1 of the accompanying drawing and the disc is rotated in the direction of an arrow 3, there is formed a track 1a, whereby recording and reproduction of information are effected on the track 1a. The information read out of the track 1a by the magnetic head 2 is subjected to frequency-modulation (FM) or modified frequency-modulation (MFM) to be described later.

Signal waveforms concerning the frequency-modulation are shown in FIGS. 2A and 2B of the accompanying drawing, and signal waveforms concerning the modified frequency-modulation are shown in FIGS. 2C and 2D of the accompanying drawing. FIG. 2A shows the original signal, in which data consits of "1" and "0". FIG. 2B shows the frequency-modulated waveform of the original signal shown in FIG. 2A, in which the abovementioned data pulses are inserted between the adjacent clock pulses $P_{C1}$, $P_{C2}$, $P_{C3}$, .... In other words, a pulse $P_{D1}$ representing the data "1" is generated between the clock pulses $P_{C1}$ and $P_{C2}$, and a "no pulse" state representing the data "0" is generated between the clock pulses $P_{C2}$ and $P_{C3}$.

In such a frequency-modulating system, since the data pulse is present between the adjacent clock pulses, the distinction between the clock pulse and the data pulse is clear. However the signal density is disadvantageously low. A modulating system that remedies this shortcoming of such a frequency-modulating system, is the modified frequency-modulating system. FIG. 2C of the accompanying drawing shows the original signal similar to that shown in FIG. 2A, in which the data consist of "1", "0", "0", "1". FIG. 2D shows the waveform of the original signal shown in FIG. 2C which has been subjected to the modified frequency-modulation. In this waveform diagram, a clock pulse $P_C$ is provided at the intermediate section of the adjacent data "0", "0" in place of the abovementioned clock pulse shown in FIG. 2B. In other words, the pulses $P_{D1}$ and $P_{D2}$ in FIG. 2D represent the data "1" shown in FIG. 2C, and a pulse $P_{C1}$ represents the clock pulse provided at the intermediate portion of the two data "0", "0". Thus, according to the modified frequency-modulation system, the quantity of the information is twice as dense as in the abovementioned frequency-modulation system (which will be seen upon comparison of FIGS. 2D and 2B) despite the fact that the pulse number per unit time is less. However, even in the modified frequency-modulation system, there is a disadvantage in that, when rotational irregularity occurs in the disc shown in FIG. 1, the system tends to be more readily affected than the frequency-modulation system with the consequence that errors in reading the data can more easily occur.

In view of the abovementioned advantages and disadvantages of the frequency-modulation system and the modified frequency-modulation system, both of them have so far been adopted equally in various kinds of computers depending on the type or model of such computers. Considering, however, the general use of the magnetic disc, it is desirable that either magnetic discs with information recorded under the frequency-modulation system or that recorded under the modified frequency-modulation system be used with the computer in common.

SUMMARY OF THE INVENTION

In view of the foregoing, it is the primary object of the present invention to provide a signal transducer capable of extracting data components from information recorded under different modulation systems.

It is another object of the present invention to provide a signal transducer capable of using a magnetic recording medium with information recorded in the FM system and the MFM system.

It is another object of the present invention to provide a signal transducer, capable of extracting data, having a simple construction.

DESCRIPTION OF THE PREFERRED EMBODIMENT

The signal transducer of the present invention is so constructed that it may be adapted for use with the magnetic disc of the FM system and the MFM system, wherein the information obtained by modulation of data (either frequency-modulation and modified frequency-modulation) is introduced as input thereinto and this input information is transduced to the data signals alone.

In the following, actual construction and operation of the signal transducer according to the present invention will be described with detail in reference to the accompanying drawing.

Figure 3:
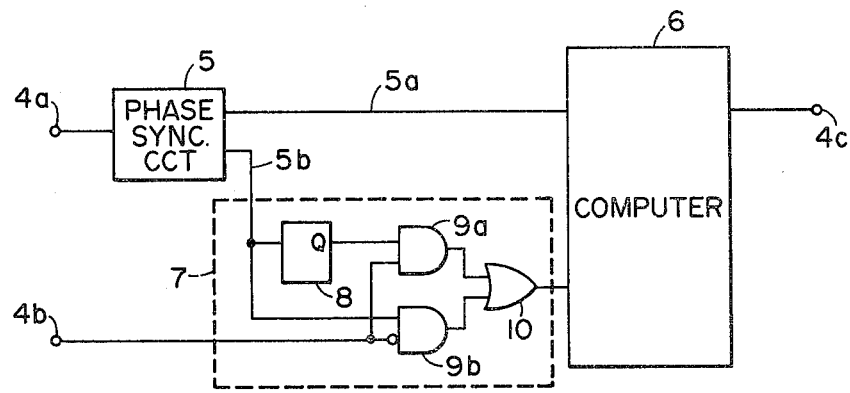
FIG. 3 is a schematic circuit construction of a signal transducer according to the present invention.

FIG. 3 is a circuit construction diagram of the signal transducer according to the present invention, and FIGS. 4A to 4D show the waveforms of a signal flowing through the circuit in FIG. 3.

Figure 1:
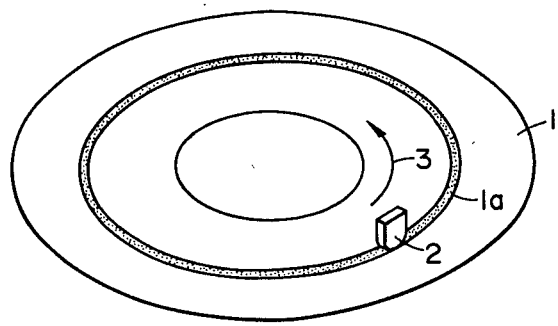
FIG. 1 is a perspective view of a magnetic disc, from which information is being read.
Figure 2:
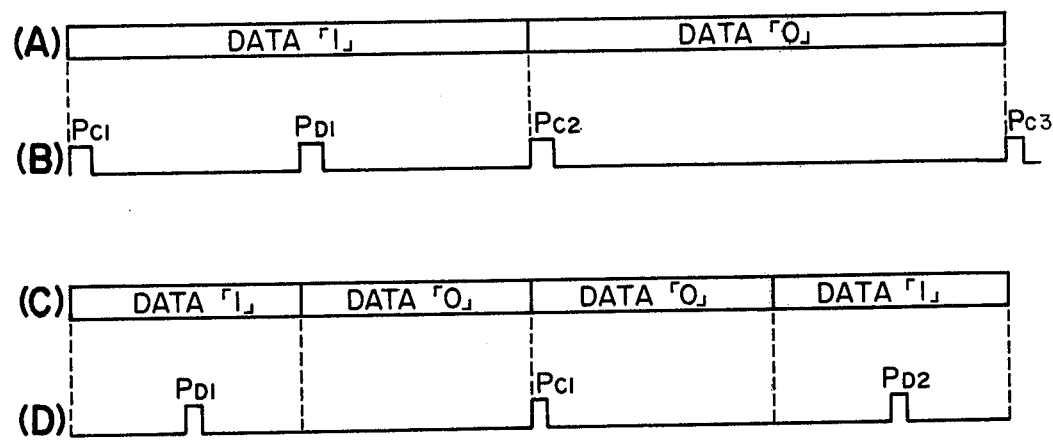
FIG. 2A is a schematic diagram showing an original signal for frequency-modulation.
FIG. 2B is a waveform diagram of a data signal which has been frequency-modulated.
FIG. 2C is a schematic diagram showing an original signal for modified frequency-modulation.
FIG. 2D is a waveform diagram of a data signal which has been subjected to modified frequency-modulation.
Figure 4:
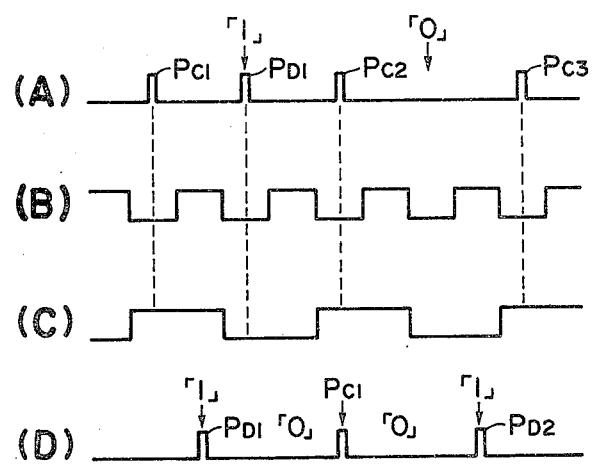
FIG. 4A is a waveform of data signal which has been frequency-modulated.
FIG. 4B is a waveform of a clock signal.
FIG. 4C is a waveform of a clock signal which has been frequency-divided in half.
FIG. 4D is a waveform of a clock signal which has been subjected to modified frequency-modulation.

In FIG. 3, signals which have been read out of a track 1a of a magentic disc 1 (recording medium) by a magnetic head 2 in FIG. 1 (information obtained by modulation of data) are introduced as input into a terminal 4a. When the signal recorded in track 1a is obtained by the frequency-modulation, the data signal (information) waveform as shown in FIG. 4A is introduced as an input into the interminal 4a and when the signal is obtained by modified frequency-modulation, the data signal waveform shown in FIG. 4D is introduced. (The FM and MFM have already been explained in reference to FIGS. 2A to 2D.) The data signal input to terminal 4a is conducted to a phase synchronizing circuit 5 which is well known and may, for example, be a circuit incorporated in the floppy disc device FDD101A manufactured and sold by Hitachi Ltd., Japan, for example. The phase synchronizing circuit functions to control the phase of the data signal of FIG. 4A or 4D, to sent out, thereafter, a data signal which is substantially equal to the input to a computer 6 through a signal line 5a, and to send out a clock signal of FIG. 4B to a transducing circuit 7, as shown by a dash-line enclosure in the drawing, through another signal line 5b. The transducing circuit 7 is constructed with a JK flipflop 8, AND circuits 9a, 9b, and an OR circuit 10. The clock signal shown in FIG. 4B is introduced as an input into the flipflop 8 and one of the inputs of the AND circuit 9b. An output from the flipflop 8 is introduced into one of the inputs of the AND circuit 9a.

The input to a terminal 4b controls conversion of the above-mentioned clock signal, which opens the AND circuit 9a when an input signal "1" is introduced, and the AND circuit 9b when an input signal "0" is introduced. An output from the AND circuits 9a, 9b is introduced into the OR circuit 10. An output from the OR circuit 10 is sent into the computer 6 to control the data signal transmitted thereinto through the signal line 5a. The computer 6 is one which is already known and may be, for example, LSI circuit HD1046503 manufactured and sold by Hitachi Ltd., Japan. The computer is capable of extracting the data components in the input information by changing the phase of the input clock signal. There, in case the input data signal from the signal line 5a is one which has been frequency-modulated (FIG. 4A), the output signal from the OR circuit 10 should be able to make a distinction between the clock pulses $P_{C1}$, $P_{C2}$, $P_{C3}$, ... and the data pulses $P_{D1}$, ... in the signal of FIG. 4A. The waveform of the clock signal shown in FIG. 4B, which is output from the signal line 5b corresponds to the abovementioned clock pulses and data pulse (data component) at the low portion of the waveform, hence no distinction can be made between them. However, when the clock signal is frequency-divided in half and transduced into the waveform shown in FIG. 4C, the clock pulse can be distinguished since it corresponds to the high portion of the signal and the data pulse (data component) can be distinguished since it corresponds to the low portion of the signal. Accordingly, when the input data signal from the signal line 5a is one which has been frequency-modulated, the signal "1" is applied to the terminal 4b, whereupon the AND circuit 9a opens and the input clock signal of FIG. 4B from the signal line 5b is frequency-divided in half by the flipflop 8 to be transduced into a waveform of FIG. 4C. The clock signal of FIG. 4C is then introduced as an input into the computer 6 through the AND circuit 9a and the OR circuit 10. In the input data signal from the signal line 5a is one which has been subjected to modified frequency-modulation (FIG. 4D), the output signal from the OR circuit 10 should be able to distinguish the clock pulses $P_{C1}$, ... from the data pulses (data component) $P_{D1}$, $P_{D2}$, ... in the signal of FIG. 4D. In the waveform of FIG. 4B, the abovementioned clock pulse can be distinguished since it corresponds to the low portion of the signal, and since the data pulse corresponds to the high portion of the signal. Accordingly, when the input data signal from the signal line 5a is the modified frequency-modulated signal, the signal "0" is applied to the terminal 4b, whereupon the AND circuit 9b opens and the clock signal of FIG. 4B is introduced as an input into the computer 6 through the AND circuit 9b and the OR circuit 10. In this manner, the computer 6 is able to accept the clock pulse from the OR circuit 10 in accordance with the modulation system of the input data signal which has been subjected to frequency-modulation or modified frequency-modulation, and which is introduced through the signal line 5a, whereby the abovementioned data pulse (data component) from the data signal (i.e., information) can be extracted, and the computation result can be output at the terminal 4C.

As described in the foregoing the signal transducer according to the present invention transduces the clock signal by selecting an input signal into the AND circuit, so that it can be adapted for use in either discs which have been subjected to the frequency-modulation or the modified frequency-modulation.

What I claim is:

1. A signal transducer, comprising:
   (a) a phase synchronizing circuit which receives as an input thereinto information obtained by modulation of data, and produces as an output therefrom said input information and clock signals synchronized with a cycle proper to said input information;
   (b) a flip-flip circuit which receives as an input thereinto the clock signal output from said phase synchronizing circuit;
   (c) a first AND circuit which receives at one of the inputs thereof an output from said flip-flop circuit;
   (d) a second AND circuit which receives at one of the inputs thereof the clock signals output from said phase synchronizing circuit;
   (e) signal input means which receives thereinto input signals to open the other input of said first AND circuit and to open any one of the other inputs of said second AND circuit;
   (f) an OR circuit which receives as input thereinto the outputs from said first and second AND circuits; and
   (g) extracting means which receives as input thereinto the information output from said phase synchronizing circuit and the output from said OR circuit, and which extracts said data from said information.

2. The signal transducer as set forth in claim 1, wherein said phase synchronizing circuit receives as an input thereinto information which has been recorded in a recording medium and has been obtained from data modulated under the frequency-modulation system or the modified frequency-moduation system.

3. The signal transducer as set forth in claim 2, wherein said signal input means receives thereinto an input signal to open said first AND circuit when said phase synchronizing circuit receives as an input thereinto information obtained from data modulation under the frequency-modulation system, and receives thereinto an input signal to open said second AND circuit when said phase synchronizing circuit receives as an input thereinto information obtained from data modulated under the modified frequency-modulation system.

4. A signal transducer comprising:

phase synchronizing circuit for receiving an input information obtained from modulating data and for separately producing as an output therefrom the input information, said circuit having a clock signal synchronized with a cycle appropriate for the input information;

frequency-dividing means for receiving as an input the clock signal from said phase synchrnoized circuit and for frequency-dividing the clock signal;

signal input means for receiving an input signal indicative of the system by which data is modulated to obtain information;

selecting means for selecting an output clock signal from between the clock signal produced from said phase synchronizing circuit and the clock signal which has been frequency-divided by said frequency dividing means, the selection being in accordance with the input signal received by said signal input means; and extracting means for extracting the data components from the input information by the use of the information produced from said phase synchronizing circuit and the output clock signal selected by said selecting means.

5. A signal transducer as set forth in claim 4, wherein said frequency dividing means is adapted to frequency divide the clock signal input thereinto by two and said signal input means is adapted to receive thereinto input signals indicative of the frequency-modulation system and the modified frequency-modulation system for modulating data to obtain information.

6. A signal transducer as set forth in claim 5, wherein said selecting means is adapted to select, as the output clock signal, the clock signal which has been frequency divided by said frequency-dividing means when the input information is obtained by modulating data under the frequency-modulation system and to select, as the output clock signal, the clock signal having phase synchronized with the phase of the information when the input information is obtained by modulating data under the modified frequency-modulation system.

7. A signal transducer as set forth in claim 4, 5 or 6, wherein said selecting means comprises a first AND circuit for receiving thereinto an input signal from said frequency-dividing means and a second AND circuit not receiving thereinto an input signal from said frequency-dividing means.

* * * * *

UNITED STATES PATENT OFFICE
CERTIFICATE OF CORRECTION

Patent No. 4,363,040     Dated December 7, 1982

Inventor(s) SHUICHI INOSE

It is certified that error appears in the above-identified patent and that said Letters Patent are hereby corrected as shown below:

Column 1, line 31, change "consits" to --consists--.

Column 3, line 6, change "interminal" to --terminal--.

IN THE CLAIMS

Claim 4, line 9, change "synchrnoized" to --synchronized--.

Signed and Sealed this

Twenty-sixth Day of April 1983

[SEAL]

Attest:

Attesting Officer

GERALD J. MOSSINGHOFF

Commissioner of Patents and Trademarks